United States Patent
Kushnerik

(10) Patent No.: US 12,246,595 B2
(45) Date of Patent: Mar. 11, 2025

(54) VARIABLE VIEWING ANGLE DISPLAYS FOR VEHICLES

(71) Applicant: TOYOTA MOTOR NORTH AMERICA, INC., Plano, TX (US)

(72) Inventor: Michael R. Kushnerik, The Colony, TX (US)

(73) Assignee: TOYOTA MOTOR NORTH AMERICA, INC., Plano, TX (US)

(*) Notice: Subject to any disclaimer, the term of this patent is extended or adjusted under 35 U.S.C. 154(b) by 210 days.

(21) Appl. No.: 17/592,090

(22) Filed: Feb. 3, 2022

(65) Prior Publication Data

US 2023/0241971 A1    Aug. 3, 2023

(51) Int. Cl.

| | |
|---|---|
| *B60K 35/00* | (2024.01) |
| *B60K 35/10* | (2024.01) |
| *B60K 35/22* | (2024.01) |
| *B60K 35/28* | (2024.01) |
| *B60K 35/29* | (2024.01) |
| *G02F 1/13* | (2006.01) |

(52) U.S. Cl.
CPC .............. *B60K 35/00* (2013.01); *B60K 35/29* (2024.01); *G02F 1/1323* (2013.01); *B60K 35/10* (2024.01); *B60K 35/22* (2024.01); *B60K 35/28* (2024.01); *B60K 2360/149* (2024.01); *B60K 2360/1523* (2024.01); *B60K 2360/164* (2024.01); *B60K 2360/195* (2024.01); *B60K 2360/27* (2024.01); *B60Y 2302/07* (2013.01); *G09G 2380/10* (2013.01)

(58) Field of Classification Search
CPC ...... B60K 2370/186; B60K 2370/1868; B60K 2370/1876; B60K 2370/164; B60K 35/29; B60K 35/22; B60K 35/28; B60K 2360/149; B60K 2360/1523; B60K 2360/164; B60K 2360/195; G02F 1/1323; G09G 2380/10

See application file for complete search history.

(56) References Cited

U.S. PATENT DOCUMENTS

| | | |
|---|---|---|
| 7,259,898 B2 | 8/2007 | Khazova |
| 7,965,268 B2 | 6/2011 | Gass |

(Continued)

OTHER PUBLICATIONS

Narakaden, "An Analysis of Car Touchscreen Infotainment Systems," Autocar India, Aug. 28, 2017, 16 pages (https://www.autocarindia.com/auto-features/all-about-car-touchscreen-systems-405762).

*Primary Examiner* — Jessica M Merlin
(74) *Attorney, Agent, or Firm* — SHEPPARD, MULLIN, RICHTER & HAMPTON LLP; Daniel N. Yannuzzi

(57) ABSTRACT

Systems and methods of distracted driving reduction are provided which respond to vehicle display-related driver distraction by adjusting the viewing angle of the vehicle display so that the driver's visual perception of the vehicle display is reduced. In other words, the driver may no longer be able to view the vehicle display with acceptable visual performance. Accordingly, examples can reduce driver distraction, thus increasing roadway safety. In certain examples, the adjusted viewing angle may allow non-driver occupants of the vehicle to view the vehicle display with acceptable visual performance. In various examples, the vehicle display may be a liquid crystal display (LCD) screen and adjusting the viewing angle of the LCD screen may comprise utilizing an electrically controllable LCD diffuser to narrow the viewing angle of the LCD screen.

10 Claims, 5 Drawing Sheets

(56) References Cited

U.S. PATENT DOCUMENTS

| | | | |
|---|---|---|---|
| 2003/0220725 A1* | 11/2003 | Harter, Jr. | B60K 35/00 701/1 |
| 2005/0179827 A1* | 8/2005 | Scharenbroch | G09G 3/3648 349/16 |
| 2008/0129684 A1* | 6/2008 | Adams | B60K 35/00 345/55 |
| 2010/0171767 A1 | 7/2010 | Waeller | |
| 2016/0170489 A1 | 6/2016 | Jung | |
| 2020/0266252 A1 | 8/2020 | Cancel Olmo | |
| 2021/0063783 A1* | 3/2021 | Byoun | G09G 3/3696 |
| 2021/0099662 A1 | 4/2021 | Arakawa | |
| 2021/0263586 A1 | 8/2021 | Wang | |
| 2022/0198971 A1* | 6/2022 | Schmid | G09G 3/002 |

\* cited by examiner

VARIABLE VIEWING ANGLE DISPLAYS FOR VEHICLES

TECHNICAL FIELD

The present disclosure relates generally to automotive systems and technologies, and more particularly, some examples relate to variable viewing angle displays for vehicles.

DESCRIPTION OF RELATED ART

A viewing angle may refer to the angle, or range of angles, at which a display/screen can be viewed with acceptable visual performance.

Variable viewing angle display technologies can adjust the viewing angle of a display in response to electronic control signals. For example, an electronically controllable liquid crystal display (LCD) diffuser can adjust the viewing angle of an LCD screen in response to electronic control signals.

BRIEF SUMMARY OF THE DISCLOSURE

According to various examples of the disclosed technology, a method for adjusting the viewing angle of a vehicle display is provided. The method, in accordance with examples of the technology disclosed herein comprises: (1) detecting, by an electronic control unit (ECU) in a vehicle, that the vehicle is moving; (2) determining, by the ECU, that a driver of the vehicle is distracted by a vehicle display, the vehicle display having a viewing angle; and (3) adjusting, by the ECU, the viewing angle of the vehicle display so that the driver's visual perception of the vehicle display is reduced.

In various examples, a vehicle system is provided. The vehicle system, in accordance with examples of the technology disclosed herein comprises: (1) a liquid crystal display (LCD) screen; and (2) an ECU including machine executable instructions in non-transitory memory to: (a) detect that the vehicle system is moving; (b) determine that a driver of the vehicle system is distracted by the LCD screen; and (c) adjust the viewing angle of the LCD screen so the driver's visual perception of the vehicle display is reduced. In certain examples, adjusting the viewing angle of the LCD screen may comprise utilizing an electrically controllable LCD diffuser to narrow the viewing angle of the LCD screen.

Other features and aspects of the disclosed technology will become apparent from the following detailed description, taken in conjunction with the accompanying drawings, which illustrate, by way of example, the features in accordance with examples of the disclosed technology. The summary is not intended to limit the scope of any inventions described herein, which are defined solely by the claims attached hereto.

BRIEF DESCRIPTION OF THE DRAWINGS

The present disclosure, in accordance with one or more various examples, is described in detail with reference to the following figures. The figures are provided for purposes of illustration only and merely depict examples.

Figure 1:
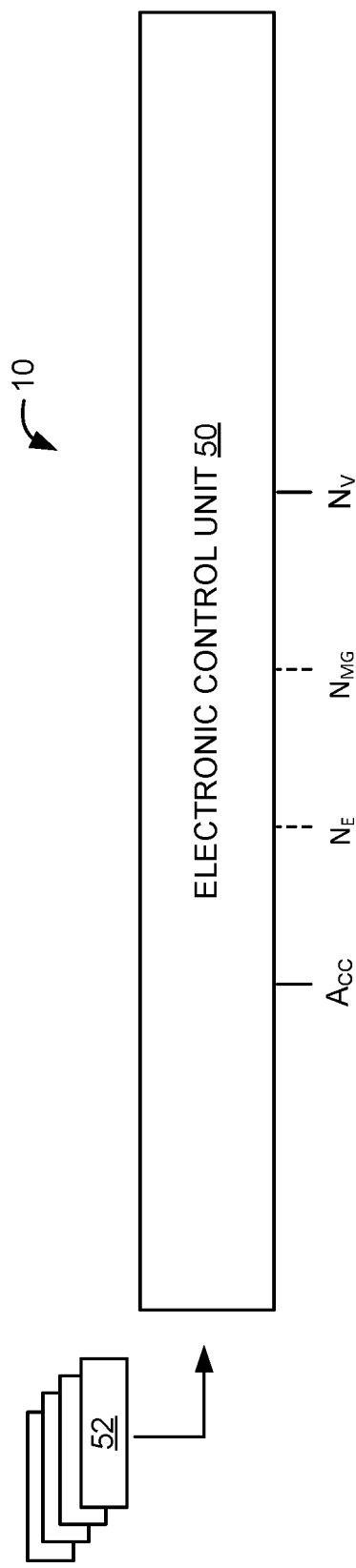
FIG. 1 is a schematic representation of an example vehicle having an electronic control unit and sensors in which examples of the disclosed technology may be implemented.

The figures are not exhaustive and do not limit the present disclosure to the precise form disclosed.

DETAILED DESCRIPTION

In-vehicle infotainment (IVI) may refer to vehicle systems which deliver entertainment and information to occupants of a vehicle through audio/video interfaces, control elements like touch screen displays, button panels, voice commands, etc. IVI technologies often include one or more displays/screens in view of the driver.

A problem with IVI systems is that they often lead to driver distraction. In particular, drivers will often stare at the display(s) of an IVI system while driving. This distracted driving can lead to accidents/collisions.

Against this backdrop, examples of the presently disclosed technology respond to vehicle display-related driver distraction by adjusting the viewing angle of the vehicle display so that the driver's visual perception of the vehicle display is reduced (in other words, the driver may no longer be able to view the vehicle display with acceptable visual performance). In this way, examples can reduce driver distraction, thus increasing roadway safety. In certain examples, non-driver vehicle occupants' visual perception of the vehicle display may not be reduced at the adjusted viewing angle (in other words, non-driver occupants may still be able to view the vehicle display with acceptable visual performance).

In various examples, an electronic control unit (ECU) in a vehicle may (1) detect that the vehicle is moving; (2) determine that a driver of the vehicle is distracted by a vehicle display; and (3) adjust the viewing angle of the vehicle display so that the driver's visual perception of the vehicle display is reduced.

Here, the ECU may first need to detect that the vehicle is moving because it can be safe/safer for a driver to look at a vehicle display when the vehicle is stationary (e.g. parked, stopped at a traffic light, etc.). In various examples, instead of detecting that the vehicle is moving, the ECU may detect that the vehicle is traveling above a threshold speed (e.g. 5 mph). This may be the case because it is safer for a driver to look at a vehicle display at low speeds.

The ECU may determine that the driver of the vehicle is distracted by a vehicle display in various ways. In certain examples, the ECU may monitor (via, e.g., an in-vehicle camera) the direction of a driver's eyes while the vehicle is moving. Accordingly, the ECU may detect that the driver's eyes are directed towards the vehicle display for a certain amount of time. Based on the amount of time the driver's eyes are directed towards the vehicle display, the ECU may determine a driver distraction value for the driver which exceeds a threshold driver distraction value (here a driver distraction value may refer to a value which quantifies a driver's level of distraction). In certain examples other factors (e.g. speed of the vehicle, complexity of the driving environment, etc.) may influence the ECU's determination of the driver distraction value. For example, for a given amount of distraction time (e.g. 2 seconds) the driver distraction value for a driver traveling at a high speed in a complex driving environment (e.g. a busy highway) may be higher than for a driver traveling at a low speed in a simple driving environment (e.g. a single-lane country road). The threshold driver distraction value may be a predetermined value, or the ECU may learn to calibrate the threshold driver distraction by observing driver habits over time.

The ECU may adjust the viewing angle of the vehicle display using various techniques. Where the vehicle display is an LCD screen, the ECU may utilize an electrically controllable LCD diffuser to narrow the viewing angle of the LCD screen so that the driver's visual perception of the LCD screen is reduced. As described above, at this narrowed viewing angle, non-driver occupants' visual perception of the LCD screen may be unaffected. In this way, driver distraction may be reduced while allowing passengers to continue to view/interact with the LCD screen.

It should be understood that the systems and methods disclosed herein may be implemented with any of a number of different vehicles and vehicle types. For example, the systems and methods disclosed herein may be used with automobiles, trucks, motorcycles, recreational vehicles and other like on or off-road vehicles. In addition, the principals disclosed herein may also extend to hybrid vehicles, gasoline- or diesel-powered vehicles, fuel-cell vehicles, electric vehicles, or other vehicles.

FIG. 1 illustrates an example vehicle (vehicle 10) having an electronic control unit 50 and sensors 52.

Electronic control unit 50 may include circuitry to control various aspects of vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, may execute instructions stored in memory to control one or more electrical systems or subsystems in the vehicle. Electronic control unit 50 can include a plurality of electronic control units such as, for example, a distracted driver detection module, a viewing angle adjustment module, an electronic engine control module, a powertrain control module, and so on. These various control units can be implemented using two or more separate electronic control units, or using a single electronic control unit.

In the example illustrated in FIG. 1, electronic control unit 50 receives information from a plurality of sensors 52 included in vehicle 10.

Sensors 52 may be included to detect conditions external to vehicle 10. For example, sensors 52 may include imaging sensors (such as cameras), and proximity sensors (such as radar, lidar, and sonar) which may be used to detect the movement/location of vehicles and pedestrians in the proximity of vehicle 10. Electronic control unit 50 may utilize the aforementioned sensors to determine/detect the complexity of the driving environment for vehicle 10. The complexity of a driving environment may be a factor that electronic control unit 50 uses to determine a distracted driving value for a driver. As described above, electronic control unit 50 may utilize this distracted driving value to determine whether the viewing angle of a vehicle display should be adjusted/narrowed in order to reduce driver distraction.

Sensors 52 may also include sensors which can be used to detect that a driver is distracted by a vehicle display. For example, sensors 52 may include imaging sensors which monitor the direction of a driver's eyes. Accordingly, the electronic control unit 50 can utilize information from these sensors to determine whether the driver is staring at a vehicle display while driving.

Sensors 52 may also include sensors which detect vehicle operation. For example, sensors 52 may include sensors which detect accelerator operation amount, $A_{CC}$, a revolution speed, $N_E$, of internal combustion engine 14 (engine RPM), a rotational speed, $N_{MS}$, of the motor 22 (motor rotational speed), and vehicle speed, $N_V$. As described above, electronic control unit 50 may use data collected from these sensors to determine that vehicle 10 is moving, or moving above a threshold speed. In certain examples, electronic control unit 50 may only adjust/narrow the viewing angle of a vehicle display when vehicle 10 is moving, or moving faster than a threshold speed. As described above, this can be because it is safe/safer for a driver to view a vehicle display while stationary or traveling at a slow speed.

One or more of the sensors 52 may include their own processing capability to compute the results for additional information that can be provided to electronic control unit 50. In other examples, one or more sensors may be data-gathering-only sensors that provide only raw data to electronic control unit 50. In further examples, hybrid sensors may be included that provide a combination of raw data and processed data to electronic control unit 50. Sensors 52 may provide an analog output or a digital output.

Figure 2:
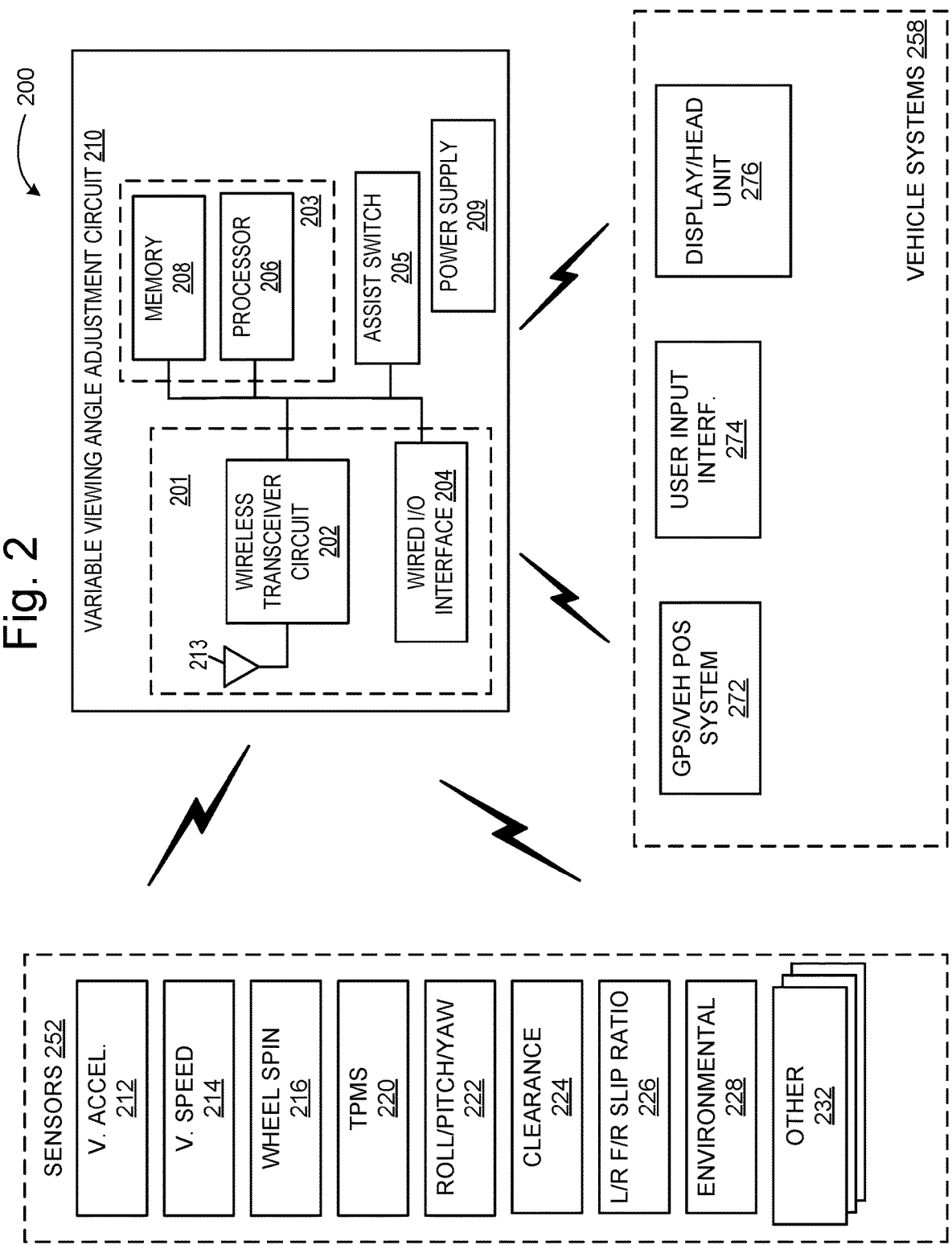
FIG. 2 illustrates an example architecture for (1) determining that a driver is distracted by a vehicle display, and (2) adjusting the viewing angle of the vehicle display to reduce driver distraction, in accordance with one example of the systems and methods described herein.

FIG. 2 illustrates an example architecture for (1) determining that a driver is distracted by a vehicle display, and (2) adjusting the viewing angle of the vehicle display to reduce driver distraction, in accordance with one example of the systems and methods described herein.

Referring now to FIG. 2, in this example, variable viewing angle system 200 includes a variable viewing angle adjustment circuit 210, a plurality of sensors 252, and a plurality of vehicle systems 258. Sensors 252 and vehicle systems 258 can communicate with variable viewing angle adjustment circuit 210 via a wired or wireless communication interface. Although sensors 252 and vehicle systems 258 are depicted as communicating with variable viewing angle adjustment circuit 210, they can also communicate with each other as well as with other vehicle systems. Variable viewing angle adjustment circuit 210 can be implemented as an ECU or as part of an ECU such as, for example electronic control unit 50. In other examples, variable viewing angle adjustment circuit 210 can be implemented independently of an ECU.

Variable viewing angle adjustment circuit 210 in this example includes a communication circuit 201, a decision circuit (including a processor 206 and memory 208 in this example) and a power supply 209. Components of variable viewing angle adjustment circuit 210 are illustrated as communicating with each other via a data bus, although other communication in interfaces can be included. Variable viewing angle adjustment circuit 210 in this example also includes a manual assist switch 205 that can be operated by the user to manually select the variable viewing angle adjustment mode.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a variable viewing angle adjustment circuit 210.

Communication circuit 201 may include either or both of a wireless transceiver circuit 202 with an associated antenna 213 and a wired I/O interface 204 with an associated hardwired data port (not illustrated). As this example illustrates, communications with variable viewing angle adjustment circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 213 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by variable viewing angle adjustment circuit 210 to/from other entities such as sensors 252 and vehicle systems 258.

Wired I/O interface 204 can include a transmitter and a receiver (not shown) for hardwired communications with other devices. For example, wired I/O interface 204 can provide a hardwired interface to other components, including sensors 252 and vehicle systems 258. Wired I/O interface 204 can communicate with other devices using Ethernet or any of a number of other wired communication protocols whether standardized, proprietary, open, point-to-point, networked or otherwise.

Power supply 209 can include one or more of a battery or batteries (such as, e.g., Li-ion, Li-Polymer, NiMH, NiCd, NiZn, and NiH$_2$, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 252 can include, for example, sensors 52 such as those described above with reference to the example of FIG. 1. Sensors 252 can also include additional sensors that may or not otherwise be included on a standard vehicle with which variable viewing angle adjustment system 200 is implemented. In the illustrated example, sensors 252 include vehicle acceleration sensors 212, vehicle speed sensors 214, wheelspin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, and environmental sensors 228 (e.g., to detect salinity or other environmental conditions).

Additional sensors 232 can also be included as may be appropriate for a given implementation of variable viewing angle adjustment system 200. For example, as alluded to above, additional sensors 232 may include imaging sensors (such as cameras), and proximity sensors (such as radar, lidar, and sonar) which may be used to detect the movement and/or location of objects, such as vehicles and pedestrians. Sensors 232 may also include sensors (e.g. imaging sensors/cameras) which monitor the direction of a driver's eyes while driving.

Vehicle systems 258 can include any of a number of different vehicle components or subsystems used to control or monitor various aspects of the vehicle and its performance. In this example, the vehicle systems 258 include a GPS or other vehicle positioning system 272 for detecting the location of vehicle 10 (including in relation to other vehicles and/or objects); user input interface 274; and display/head unit 276.

User input interface 274 may include one or more user input interfaces such as buttons, knobs, hard keys, soft keys, voice-controlled input, a touch screen element or aspect of display/head unit 276, and the like.

Display/head unit 276 may be used to present audio-visual notifications to the driver. In certain examples display/head unit 276 may be implemented as part of an in-vehicle infotainment (IVI) system (as described above, IVI systems may deliver entertainment and information to occupants of a vehicle through audio/video interfaces, control elements like touch screen displays, button panels, voice commands, etc.). In certain examples display/head unit 276 may be a liquid crystal display (LCD) screen. Accordingly, variable viewing angle adjustment circuit 210 may utilize an electronically controlled LCD diffuser to adjust the viewing angle of display/head unit 276 in response to distracted driving. In various examples, display/head unit 276 may comprise multiple displays/screens, e.g., a dashboard display, a heads up display, etc. Accordingly, variable viewing angle adjustment circuit 210 can adjust the viewing angles of these multiple displays/screens in response to distracted driving.

During operation, variable viewing angle adjustment circuit 210 can receive information from various vehicle sensors to determine whether to provide variable viewing angle adjustment. Communication circuit 201 can be used to transmit and receive information between variable viewing angle adjustment circuit 210 and sensors 252, and variable viewing angle adjustment circuit 210 and vehicle systems 258. Also, sensors 252 may communicate with vehicle systems 258 directly or indirectly (e.g., via communication circuit 201 or otherwise).

Figure 3:
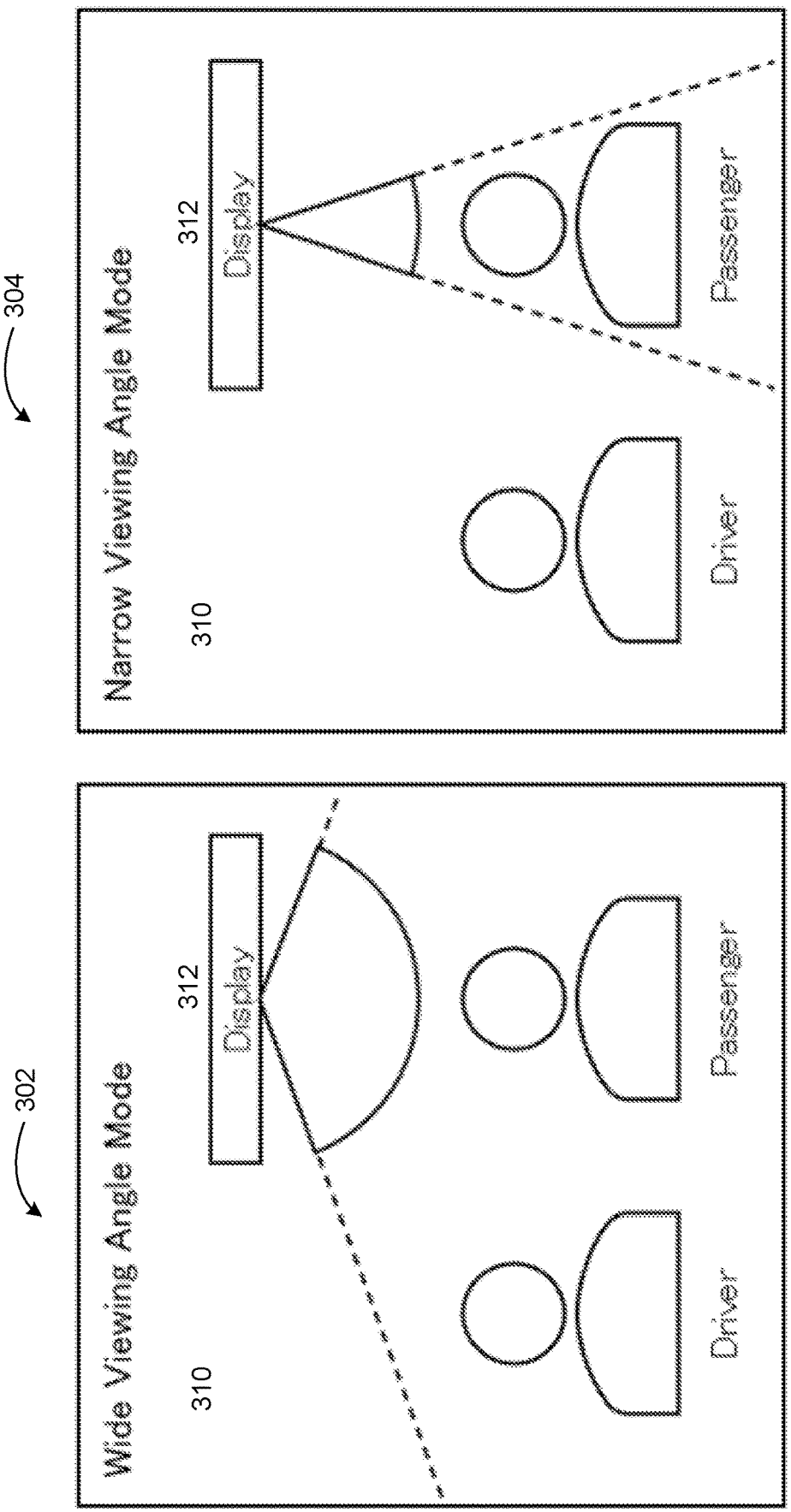
FIG. 3 depicts an example of viewing angle adjustment for a vehicle display, in accordance with various examples of the disclosed technology.

FIG. 3 depicts an example of viewing angle adjustment for a vehicle display, in accordance with various examples of the disclosed technology.

Here, diagram 302 depicts a display 312 in vehicle 310 at a first time. Diagram 304 depicts display 312 at a second time.

As depicted in diagram 302, at the first time, display 312 has a wide viewing angle (i.e. the first viewing angle). As described above, a viewing angle may refer to the angle, or range of angles, at which a display/screen can be viewed with acceptable visual performance. At this first viewing angle, both the driver of vehicle 310 and a passenger of vehicle 310 (who may be seated in the passenger seat next to the driver) may be able to view display 312 with acceptable visual performance.

As described above, an ECU in vehicle 310 (not pictured) may determine that the driver of vehicle 310 has become distracted by display 312 (i.e. the driver may be looking at display 312 instead of the road while driving). In response to this detected driver distraction, the ECU may adjust the viewing angle of display 312 in order to reduce driver distraction. In other words, the ECU may adjust the viewing angle of display 312 so that the driver's visual perception of display 312 is reduced.

Accordingly, as depicted by diagram 304, at the second time, display 312 has a narrower viewing angle (i.e. the second viewing angle). At this second viewing angle, the driver's visual perception of display 312 is reduced. In other words, the driver may no longer be able to view display 312 with acceptable visual performance. However, in this example, the passenger of vehicle 310 may still view display 312 with acceptable visual performance. In this way, driver distraction may be reduced while allowing the passenger to continue to view/interact with the display.

It should be understood that in other examples the viewing angle of display 312 may be adjusted differently. For example, the viewing angle of display 312 may be shifted away from the driver.

Figure 4:
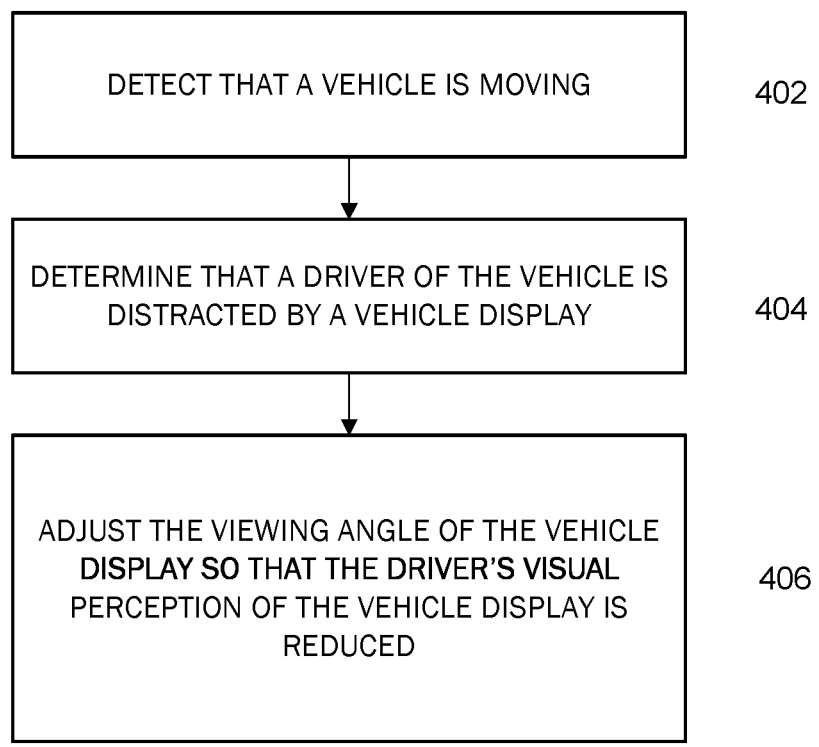
FIG. 4 is a flowchart illustrating example operations that can be performed by an ECU in a vehicle to adjust the viewing angle of a vehicle display in response to distracted driving, in accordance with various examples of the disclosed technology.

FIG. 4 is a flowchart illustrating example operations that can be performed by an ECU in a vehicle to adjust the viewing angle of a vehicle display in response to distracted driving, in accordance with various examples of the disclosed technology.

At operation 402, the ECU may detect that the vehicle is moving. The ECU may first detect that the vehicle is moving because it can be safe/safer for a driver to look at a vehicle display when the vehicle is stationary (e.g. parked, stopped at a traffic light, etc.). In various examples, instead of detecting that the vehicle is moving, the ECU may detect that the vehicle is traveling above a threshold speed (e.g. 5 mph). This may be the case because it is safer for a driver to look at a vehicle display at low vehicle speeds.

As described in conjunction with FIGS. 1 and 2, the ECU may utilize various sensors of the vehicle to determine that the vehicle is moving/moving above a threshold speed.

At operation 404, the ECU may determine that a driver of the vehicle is distracted by a vehicle display. Here, the vehicle display may have a first viewing angle at which the driver can view the vehicle display with acceptable visual performance.

In certain examples, the vehicle display may be a liquid crystal display (LCD) screen. In some examples, the vehicle display may be part of an in-vehicle infotainment (IVI) system (as described above, an IVI system may deliver entertainment and information to occupants of a vehicle through audio/video interfaces, control elements like touch screen displays, button panels, voice commands, etc.).

The ECU may determine that the driver is distracted by the vehicle display using various monitoring techniques. For example, the ECU may monitor (via, e.g., an in-vehicle camera) the direction of the driver's eyes while the vehicle is moving. Accordingly, the ECU may detect that the driver's eyes are directed towards the vehicle display for a certain amount of time. Based on the amount of time the driver's eyes are directed towards the vehicle display, the ECU may determine a driver distraction value for the driver which exceeds a threshold driver distraction value (here a driver distraction value may refer to a value which quantifies a driver's level of distraction). In certain examples other factors (e.g. speed of the vehicle, complexity of the driving environment, etc.) may influence the ECU's determination of the driver distraction value. In other words, for a given amount of distraction time (e.g. 2 seconds) the distraction value for a driver traveling at a high speed in a complex driving environment (e.g. a busy highway) may be higher than for a driver traveling at a low speed in a simple driving environment (e.g. a single-lane country road). The threshold driver distraction value may be a predetermined value, or the ECU may learn to calibrate the threshold driver distraction by observing driver habits over time.

At operation 406, in response to a determination that the driver is distracted by the vehicle display, the ECU may adjust the viewing angle of the vehicle display so that the driver's visual perception of the vehicle display is reduced. In certain examples, this may comprise adjusting the viewing angle of the vehicle display so that the driver cannot view the visual display with acceptable visual performance. Accordingly, the ECU may reduce driver distraction, thus improving roadway safety.

The ECU may adjust the viewing angle of the visual display in various ways. In certain examples, the ECU may narrow the viewing angle of the vehicle display, or shift the viewing angle of the vehicle display away from the driver. In examples where the vehicle display is an LCD screen, the ECU may utilize an electrically controllable LCD diffuser to adjust the viewing angle of the LCD screen.

In some cases, the ECU may selectively adjust the viewing angle of certain areas of the visual display based on how critical the information displayed in such areas is to the driver. For example, the ECU may narrow the viewing angle of a first area of the visual display which is showing entertainment-related information, while leaving a second area of the visual display which is showing driver critical information (e.g., vehicle-related information such as speed and fuel efficiency, safety related information such as blind spot warnings, etc.) unaffected. In this way, the ECU may selectively reduce the driver's perception of less driver critical information, thus reducing driver distraction.

As described above, at the adjusted viewing angle, non-driver vehicle occupants' visual perception of the vehicle display may be unaffected. In other words, they may still be able to view the vehicle display with acceptable visual performance. In this way, driver distraction may be reduced while allowing passengers to continue to view/interact with the vehicle display.

Figure 5:
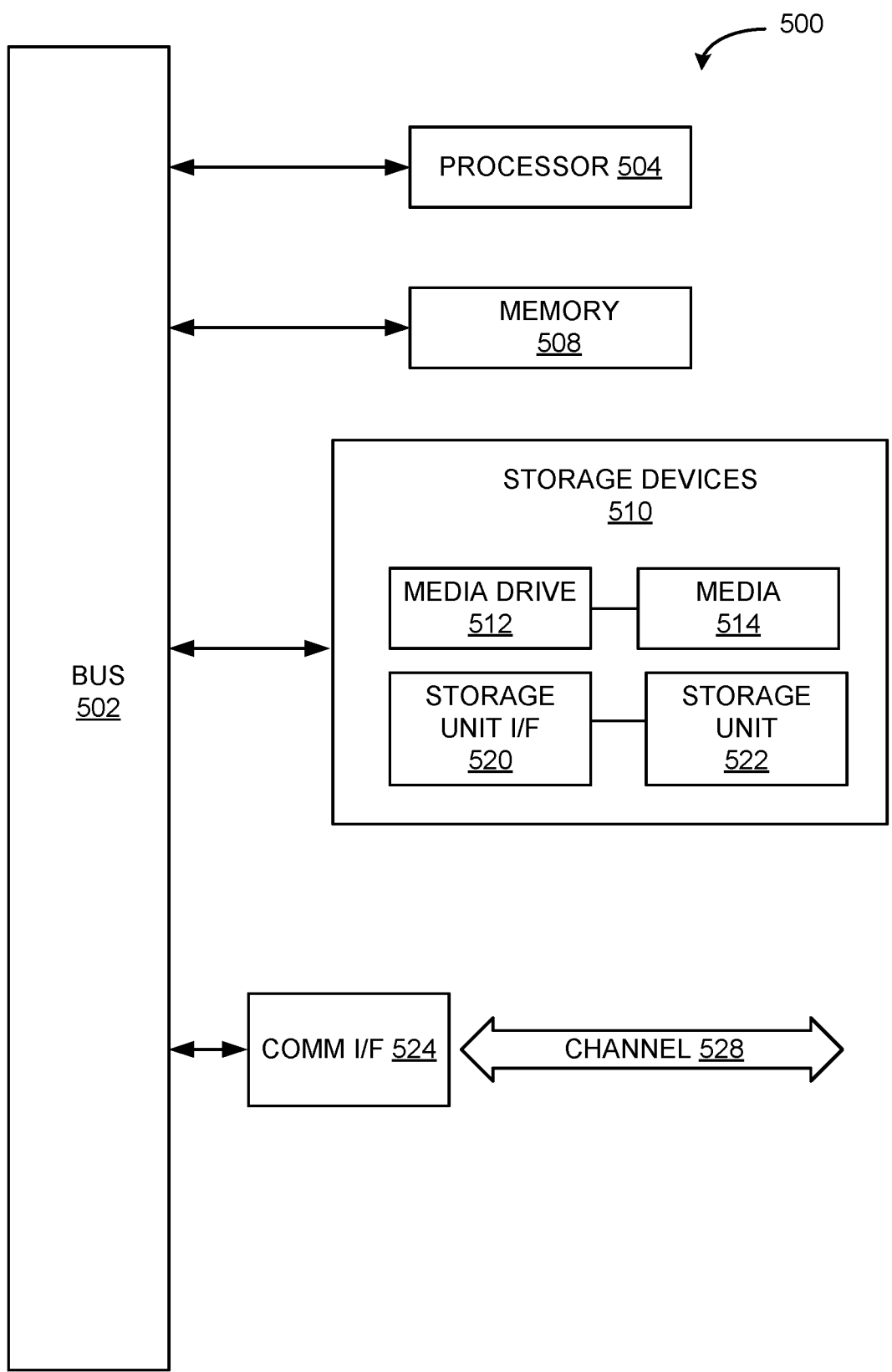
FIG. 5 is an example computing component that may be used to implement various features of examples described in the present disclosure.

As used herein, the terms circuit and component might describe a given unit of functionality that can be performed in accordance with one or more examples of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various examples are described in terms of this example—computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative examples, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual examples are not limited in their applicability to the particular example with which they are described. Instead, they can be applied, alone or in various combinations, to one or more other examples, whether or not such examples are described and whether or not such features are presented as being a part of a described example. Thus, the breadth and scope of the present application should not be limited by any of the above-described exemplary examples.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various examples set forth herein are described in terms of exemplary block diagrams, flow charts and other illustrations. As will become apparent to one of ordinary skill in the art after reading this document, the illustrated examples and their various alternatives can be implemented without confinement to the illustrated examples. For example, block diagrams and their accompanying description should not be construed as mandating a particular architecture or configuration.

What is claimed is:

1. A computer-implemented method comprising:
   detecting that a vehicle is moving;
   in response to detecting eyes of a driver of the vehicle are directed toward a vehicle display, determining a driver distraction value for the driver exceeds a threshold value; and
   in response to determining the driver distraction value exceeds the threshold value, adjusting a viewing angle of the vehicle display in a manner that concurrently reduces visual perceptibility of images displayed on the vehicle display from a perspective of the driver by a greater amount than from a perspective of a passenger of the vehicle.

2. The computer-implemented method of claim 1, wherein adjusting the viewing angle of the vehicle display comprises adjusting the viewing angle of the vehicle display so that the perceptibility of images displayed on the vehicle display is below a threshold level from the perspective of the driver.

3. The computer-implemented method of claim 2, wherein, at the adjusted viewing angle, the visual perceptibility of images displayed on the vehicle display is above a threshold level from the perspective of the passenger.

4. The computer-implemented method of claim 1, wherein adjusting the viewing angle of the vehicle display comprises narrowing the viewing angle of the vehicle display.

5. The computer-implemented method of claim 1, wherein the vehicle display comprises a liquid crystal display (LCD) screen.

6. The computer-implemented method of claim 5, wherein adjusting the viewing angle of the LCD screen comprises utilizing an electrically controllable LCD diffuser.

7. A vehicle comprising:
   a liquid crystal display (LCD) screen; and
   one or more processors operable to execute machine executable instructions in non-transitory memory to:
      detect the vehicle is moving;
      in response to detecting eyes of a driver of the vehicle are directed towards the LCD screen, determine a driver distraction value for the driver exceeds a threshold value; and
      in response to determining the driver distraction value exceeds the threshold value, adjust a viewing angle of the LCD screen in a manner that reduces visual perceptibility of images displayed on the LCD screen by a greater amount than from a perspective of a passenger of the vehicle.

8. The vehicle of claim 7, wherein adjusting the viewing angle of the LCD screen comprises utilizing an electrically controllable LCD diffuser to narrow the viewing angle of the LCD screen.

9. The vehicle of claim 7, wherein the LCD screen is implemented as part of an in-vehicle infotainment system.

10. The vehicle of claim 7, wherein, at the adjusted viewing angle, the visual perceptibility of images displayed on the LCD screen is above a threshold level from the perspective of the passenger.

* * * * *